United States Patent
Raghavan et al.

(10) Patent No.: US 12,034,675 B2
(45) Date of Patent: Jul. 9, 2024

(54) SIGNALING FOR INTER-BAND CARRIER AGGREGATION

(71) Applicant: QUALCOMM Incorporated, San Diego, CA (US)

(72) Inventors: Vasanthan Raghavan, West Windsor Township, NJ (US); Joseph Patrick Burke, San Diego, CA (US); Timo Ville Vintola, San Diego, CA (US); Juergen Cezanne, Ocean Township, NJ (US); Ozge Koymen, Princeton, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 505 days.

(21) Appl. No.: 16/878,392

(22) Filed: May 19, 2020

(65) Prior Publication Data

US 2021/0006381 A1 Jan. 7, 2021

Related U.S. Application Data

(60) Provisional application No. 62/869,945, filed on Jul. 2, 2019.

(51) Int. Cl.
*H04L 5/00* (2006.01)
*H04W 72/0453* (2023.01)
(Continued)

(52) U.S. Cl.
CPC ............ *H04L 5/0092* (2013.01); *H04L 5/001* (2013.01); *H04L 5/0094* (2013.01);
(Continued)

(58) Field of Classification Search
CPC ..... H04L 5/0092; H04L 5/001; H04L 5/0094; H04W 76/27; H04W 72/0453; H04W 72/048

See application file for complete search history.

(56) References Cited

U.S. PATENT DOCUMENTS

2013/0142139 A1 6/2013 Kitazoe et al.
2019/0082425 A1 3/2019 Li et al.
(Continued)

FOREIGN PATENT DOCUMENTS

WO 2019096254 A1 5/2019

OTHER PUBLICATIONS

Intel Corporation: "On BWP Switching," 3GPP Draft, 3GPP TSG-RAN4 Meeting #87, R4-1807935, 3rd Generation Partnership Project (3GPP), Mobile Competence Centre, 650, Route Des Lucioles, F-06921, Sophia-Antipolis Cedex, France, vol. RAN WG4. No. Busan. South Korea, May 21, 2018-May 25, 2018, May 31, 2018 (May 31, 2018), XP051578087, pp. 1-7, Retrieved from the Internet: URL: http://www.3gpp.org/ftp/tsg%5Fran/WG4%5FRadio/TSGR4%5F87/Docs/R4%2D1807935%2Ezip [retrieved on May 31, 2018] p. 5. section 3.1.

(Continued)

*Primary Examiner* — Ricky Q Ngo
*Assistant Examiner* — Stephen N Steiner
(74) *Attorney, Agent, or Firm* — Harrity & Harrity/Qualcomm Incorporated

(57) ABSTRACT

Various aspects of the present disclosure generally relate to wireless communication. In some aspects, a user equipment (UE) may determine a set of bandwidth part (BWP) combinations for an inter-band carrier aggregation configuration in a frequency range above 24 GHz. The UE may transmit an indication of the set of BWP combinations to initiate a reconfiguration of a BWP combination for the UE. Numerous other aspects are provided.

30 Claims, 6 Drawing Sheets

(51) Int. Cl.
*H04W 72/51* (2023.01)
*H04W 76/27* (2018.01)

(52) U.S. Cl.
CPC ....... *H04W 72/0453* (2013.01); *H04W 72/51* (2023.01); *H04W 76/27* (2018.02)

(56) References Cited

U.S. PATENT DOCUMENTS

2020/0328864 A1* 10/2020 Choi ................... H04L 5/0082
2020/0403761 A1* 12/2020 Nguyen ................ H04L 5/001

OTHER PUBLICATIONS

International Search Report and Written Opinion—PCT/US2020/033809—ISA/EPO—Aug. 10, 2020.

* cited by examiner

SIGNALING FOR INTER-BAND CARRIER AGGREGATION

CROSS-REFERENCE TO RELATED APPLICATION

This patent application claims priority to U.S. Provisional Patent Application No. 62/869,945, filed on Jul. 2, 2019, entitled "SIGNALING FOR INTER-BAND CARRIER AGGREGATION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for signaling for inter-band carrier aggregation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, further improvements in LTE and NR technologies remain useful. Preferably, these improvements should be applicable to other multiple access technologies and the telecommunication standards that employ these technologies.

SUMMARY

In some aspects, a method of wireless communication, performed by a UE, may include determining a set of bandwidth part (BWP) combinations for an inter-band carrier aggregation (CA) configuration in a frequency range above 24 GHz; and transmitting an indication of the set of BWP combinations to initiate a reconfiguration of a BWP combination for the UE.

In some aspects, a method of wireless communication, performed by a base station, may include receiving an indication of a set of BWP combinations for a UE for an inter-band CA configuration in a frequency range above 24 GHz; and configuring a BWP combination for the UE in accordance with the indication of the set of BWP combinations.

In some aspects, a UE for wireless communication may include memory and one or more processors operatively coupled to the memory. The memory and the one or more processors may be configured to determine a set of BWP combinations for an inter-band CA configuration in a frequency range above 24 GHz; and transmit an indication of the set of BWP combinations to initiate a reconfiguration of a BWP combination for the UE.

In some aspects, a base station for wireless communication may include memory and one or more processors operatively coupled to the memory. The memory and the one or more processors may be configured to receive an indication of a set of BWP combinations for a UE for an inter-band CA configuration in a frequency range above 24 GHz; and configure a BWP combination for the UE in accordance with the indication of the set of BWP combinations.

In some aspects, a non-transitory computer-readable medium may store one or more instructions for wireless communication. The one or more instructions, when executed by one or more processors of a UE, may cause the one or more processors to: determine a set of BWP combinations for an inter-band CA configuration in a frequency range above 24 GHz; and transmit an indication of the set of BWP combinations to initiate a reconfiguration of a BWP combination for the UE.

In some aspects, a non-transitory computer-readable medium may store one or more instructions for wireless communication. The one or more instructions, when executed by one or more processors of a base station, may cause the one or more processors to: receive an indication of a set of BWP combinations for a UE for an inter-band CA configuration in a frequency range above 24 GHz; and configure a BWP combination for the UE in accordance with the indication of the set of BWP combinations.

In some aspects, an apparatus for wireless communication may include means for determining a set of BWP combinations for an inter-band CA configuration in a frequency range above 24 GHz; and means for transmitting an indication of the set of BWP combinations to initiate a reconfiguration of a BWP combination for the apparatus.

In some aspects, an apparatus for wireless communication may include means for receiving an indication of a set of BWP combinations for a UE for an inter-band CA configuration in a frequency range above 24 GHz; and means for configuring a BWP combination for the UE in accordance with the indication of the set of BWP combinations.

Aspects generally include a method, apparatus, system, computer program product, non-transitory computer-readable medium, user equipment, base station, wireless communication device, and/or processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
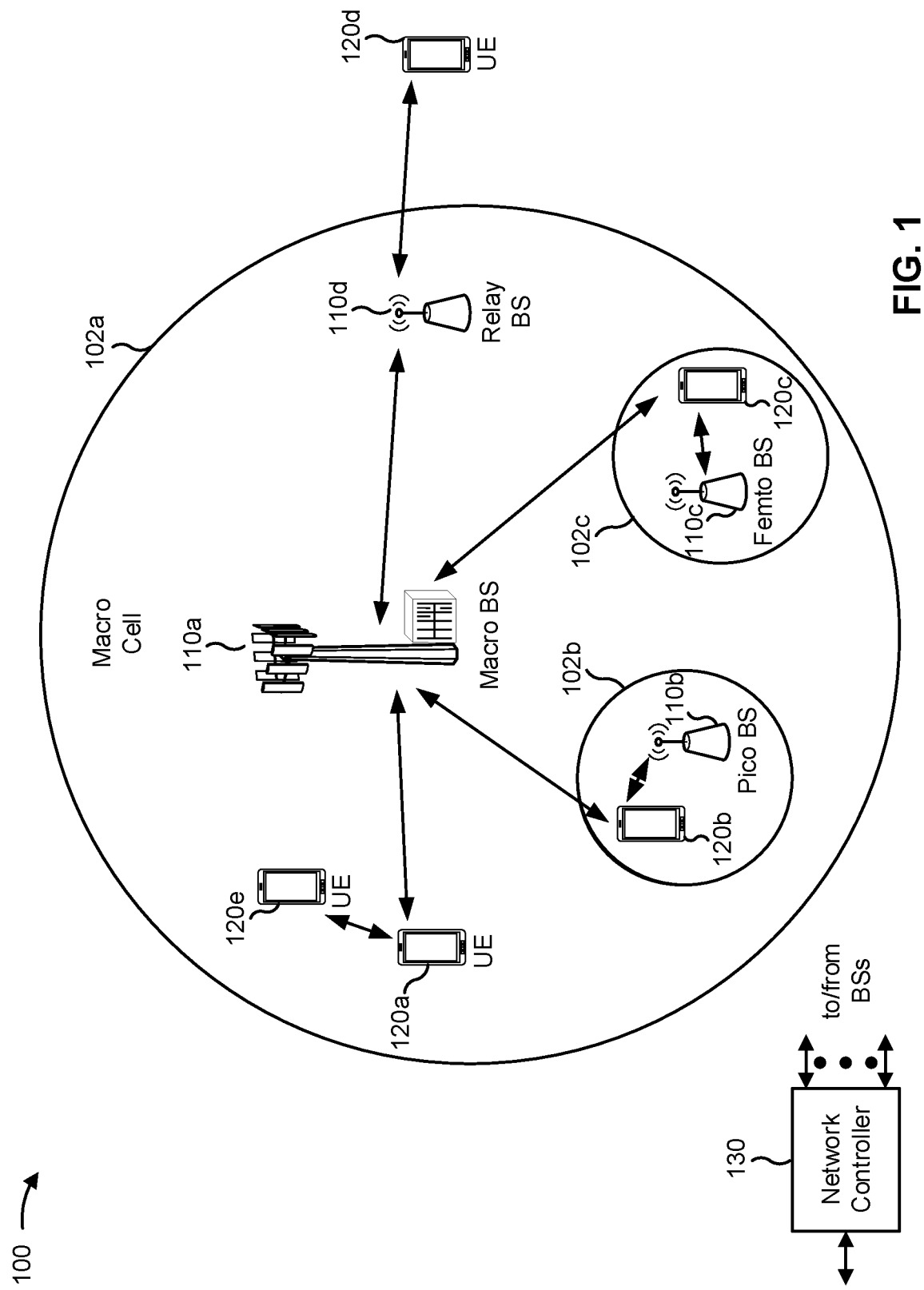
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
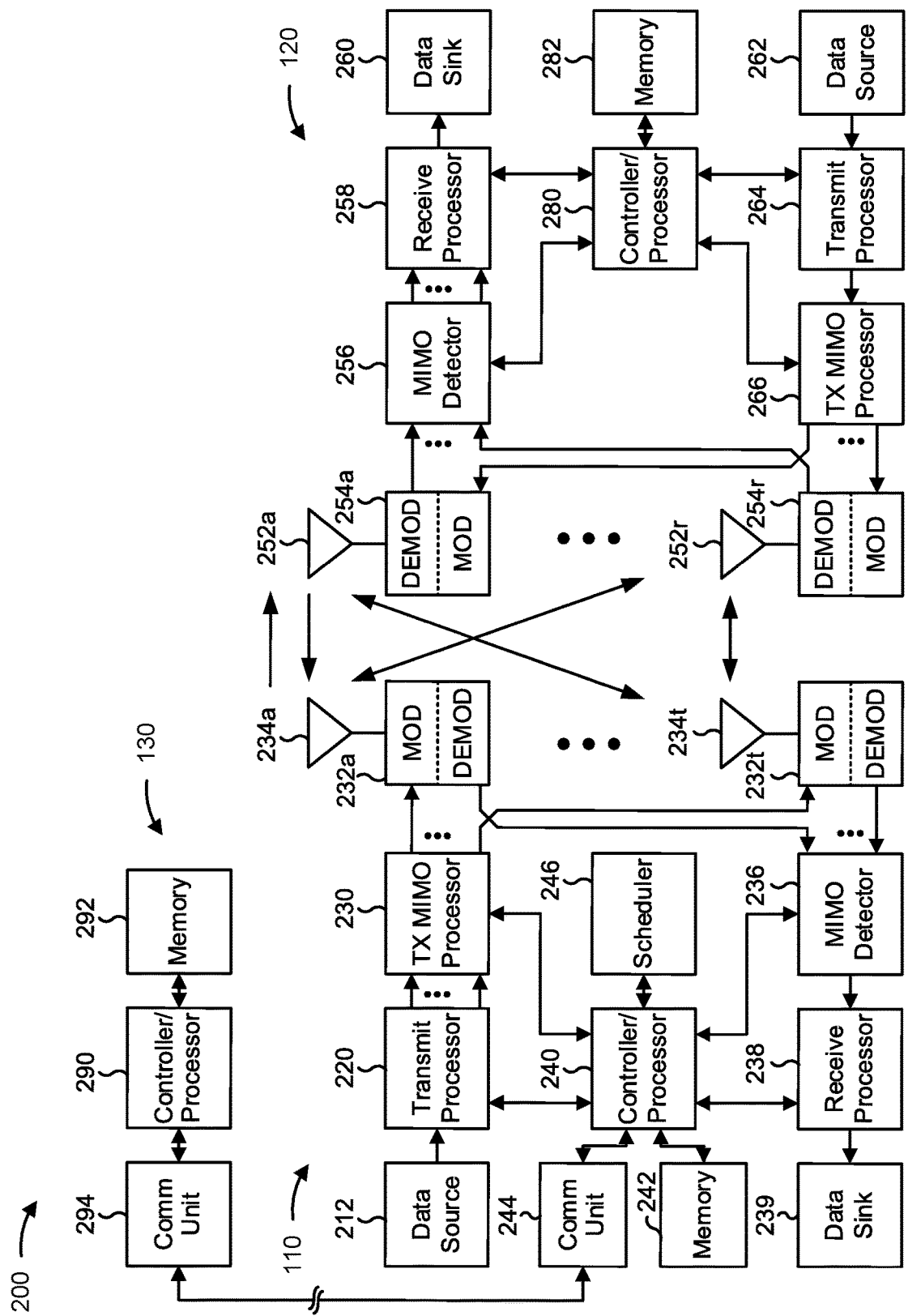
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with signaling for inter-band carrier aggregation (CA), as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. Memories 242 and 282 may store data and program codes for base station 110 and UE 120, respectively. Memory 282 of the UE can comprise a non-transitory computer-readable medium storing one or more instructions for wireless communication, where the one or more instructions comprise one or more instructions that, when executed by one or more processors (e.g., processor 258 and/or controller/processor 280) of the UE 120, cause the one or more processors to perform the method described in greater detail with reference to FIGS. 3-6. A scheduler 246 may schedule UEs for data transmission on the downlink and/or uplink.

In some aspects, UE 120 may include means for determining a set of bandwidth part (BWP) combinations for an inter-band CA configuration in a frequency range above 24 GHz (e.g., using controller/processor 280 and/or the like); means for transmitting an indication of the set of BWP combinations to initiate a reconfiguration of a BWP combination for the UE (e.g., using controller/processor 280, transmit processor 264, TX MIMO processor 266, MOD 254, antenna 252, and/or the like); means for detecting a change in a condition at the UE (e.g., using antenna 252, DEMOD 254, MIMO detector 256, receive processor 258, controller/processor 280, and/or the like); means for transmitting an updated indication of an updated set of BWP combinations based at least in part on detecting the change in the condition at the UE (e.g., using controller/processor 280, transmit processor 264, TX MIMO processor 266, MOD 254, antenna 252, and/or the like); and/or the like. In some aspects, such means may include one or more components of UE 120 described in connection with FIG. 2.

In some aspects, base station 110 may include means for receiving an indication of a set of BWP combinations for a UE for an inter-band CA configuration in a frequency range above 24 GHz (e.g., using antenna 234, DEMOD 232, MIMO detector 236, receive processor 238, controller/processor 240, and/or the like); means for configuring a BWP combination for the UE in accordance with the indication of the set of BWP combinations (e.g., using controller/processor 240, transmit processor 220, TX MIMO processor 230, MOD 232, antenna 234, and/or the like); means for receiving an updated indication of an updated set of BWP combinations based at least in part on a change in a condition at the UE (e.g., using antenna 234, DEMOD 232, MIMO detector 236, receive processor 238, controller/processor 240, and/or the like); and/or the like. In some aspects, such means may include one or more components of base station 110 described in connection with FIG. 2.

As indicated above, FIG. 2 is provided as an example. Other examples may differ from what is described with regard to FIG. 2.

Some radio access technologies (RATs), such as 5G/NR, may operate in the millimeter wave (mmWave or mmW) spectrum. For example, Frequency Range 2 (FR2) of 5G/NR may include frequency bands above approximately 24 GHz (e.g., in a range of approximately 24 GHz to approximately 52.6 GHz, as compared to FR1, which may operate in a range of approximately 450 MHz to 7.125 GHz).

5G/NR UEs may use carrier aggregation (CA), in which bandwidth parts on multiple bands are used for uplink communications and/or downlink communications. A configured subset of the bandwidth of a carrier or band may be referred to as a bandwidth part. CA may be specified for particular combinations of operating bands and numbers of component carriers. For example, an aggregated transmission bandwidth configuration (ATBC) may identify a total number of physical resource blocks (PRBs) to be used by a UE. A CA bandwidth class may indicate a combination of a maximum ATBC and a maximum number of component carriers (CCs) to be used by the UE. A CA configuration may indicate a combination of one or more operating bands and one or more CA bandwidth classes. The UE may signal UE capability information that identifies a bandwidth class for the downlink and/or the uplink.

FR2 communications may be associated with more challenging operating constraints than FR1 due to higher power consumption, maximum permissible exposure (MPE) limits, increased thermal loading, more complex antenna array/subarray structure, and so on. UEs configured to use FR2 may be associated with complex radio frequency (RF) chain configurations, such as 2 receive chains and 2 transmit chains (denoted as 2Rx/2Tx), 4 receive chains and 2 transmit chains (4Rx/2Tx), 4 receive chains and 4 transmit chains (4Rx/4Tx), 8 receive chains and 8 transmit chains (8Rx/8Tx), and so on. If a BS configures a set of BWPs for inter-band CA for a UE in FR2 without knowledge of conditions or configurations at the UE, the above operating constraints may be difficult to satisfy or may be violated. Also, the flexibility of CA and BWP configurations in 5G/NR may mean that bandwidth-class-based signaling techniques are insufficient to enable the UE to signal inter-band CA capabilities with which the UE can satisfy the operating constraints of FR2 bands.

Some techniques and apparatuses described herein provide signaling of UE capabilities for inter-band CA in FR2 using an indication that identifies a set of BWP combinations that the UE can use. For example, from a first set of configured BWPs on a first FR2 band and a second set of configured BWPs on a second FR2 band, the UE may signal one or more pairs of BWPs on the first FR2 band and the second FR2 band that the UE can/prefers to use. The UE may select these BWP combinations based at least in part on a condition at the UE, as described in more detail below. Thus, increased signaling precision and flexibility is provided, which enables the UE to select and signal BWP combinations that satisfy operating constraints of the UE on FR2 bands.

Figure 3:
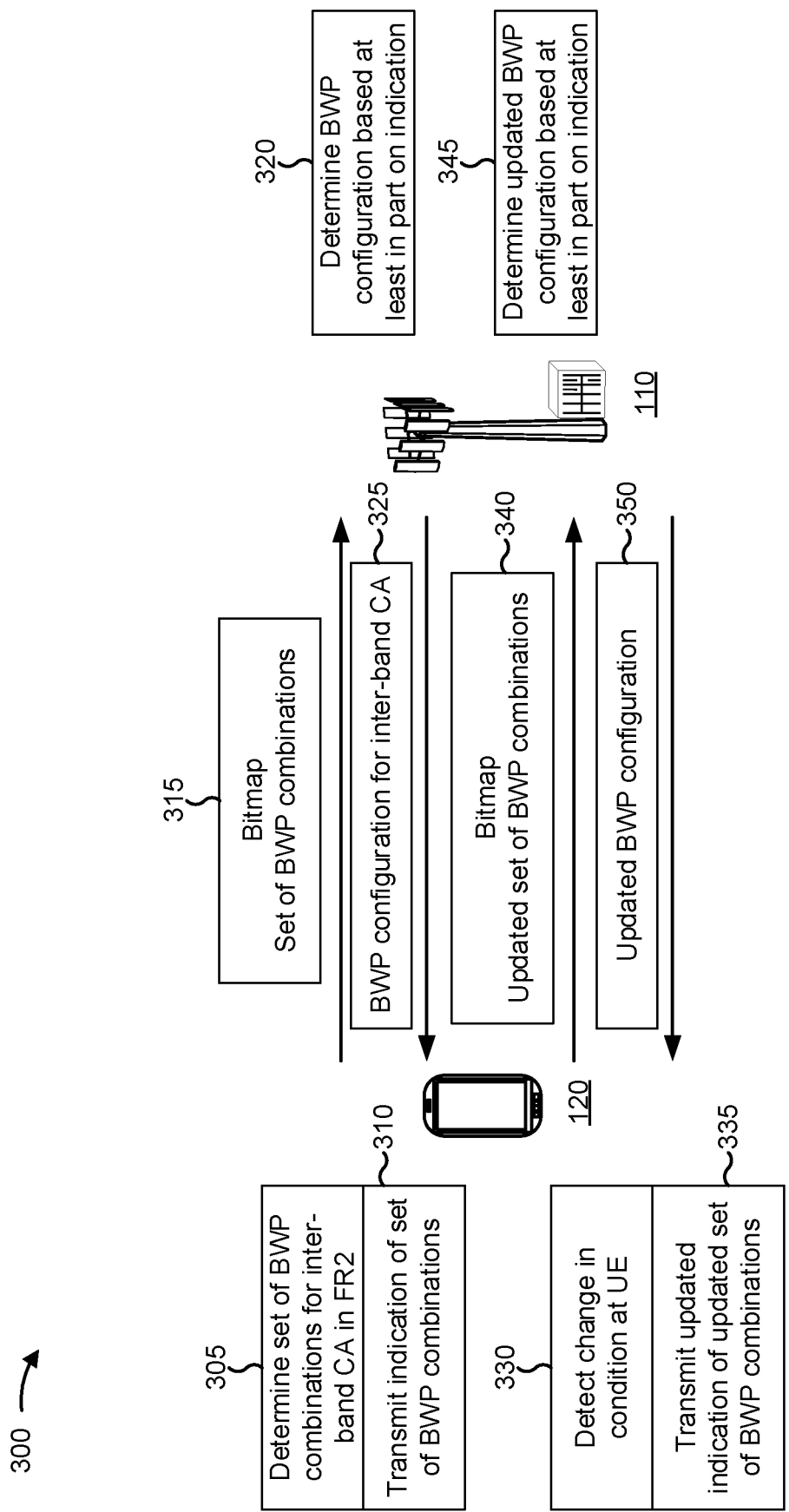
FIG. 3 is a diagram illustrating an example of signaling for inter-band CA, in accordance with various aspects of the present disclosure.

FIG. 3 is a diagram illustrating an example 300 of signaling for inter-band CA, in accordance with various aspects of the present disclosure. As shown, FIG. 3 includes a UE 120 and a BS 110. In example 300, the UE 120 and the BS 110 operate in FR2. However, it should be understood that the techniques and apparatuses described herein can be applied in other frequency ranges, such as FR1, FR3, FR4, and so on.

As shown by reference number 305, the UE 120 may determine a set of BWP combinations for inter-band CA in FR2. A BWP is a subset of contiguous common PRBs. Multiple BWPs can be configured for use in the downlink and in the uplink. Additional BWPs can be configured for a supplementary uplink (if the supplementary uplink is configured). Different BWPs can use different numerologies, such as for coexistence or legacy reasons, and may have different bandwidths. For each BWP, the BS 110 can configure the numerology of the BWP, the size of the BWP, and a control resource set (CORESET) and corresponding transmission configuration indication (TCI) state associated with the BWP. The TCI state may indicate a beam configuration, such as a quasi-colocation type and/or a quasi-colocation source associated with the BWP. The UE 120 may use one active BWP from the set of configured BWPs on each of the uplink and the downlink. In some aspects, the UE 120 may determine the set of BWP combinations based at least in part on configured BWPs of each band in the inter-band CA configuration. For example, the UE 120 may select the set of BWP combinations from the configured BWPs.

A BWP combination may identify an active BWP on each band active for the inter-band CA. For example, if bands A, B, and C are active, a BWP combination may identify an active BWP on band A, an active BWP on band B, and an active BWP on band C. A set of BWP combinations may identify one or more BWP combinations that the UE 120 may signal as supported or requested by the UE 120. For an example of BWP combinations and sets of BWP combinations, refer to FIG. 4.

In some aspects, the UE 120 may determine a default set or an initial set of BWP combinations (e.g., at connection setup, when no particular condition at the UE 120 is satisfied, and/or the like). In some aspects, the UE 120 may determine a set of BWP conditions based at least in part on a condition at the UE 120. For example, the condition may include a thermal condition, a power usage condition, a battery condition, a maximum permissible exposure (MPE) condition, a dynamic choice of antenna numbers from a set of antenna modules supported by the UE 120, a preferred subarray type supported by the UE 120, a use case (e.g., a data rate use case, a latency use case, and/or the like), or another type of condition.

As shown by reference number 310, the UE 120 may transmit an indication of the set of BWP configurations. In this case, as shown by reference number 315, the indication includes a bitmap, though the indication may take any form that conveys the set of BWP combinations. In some aspects, the indication may be provided as UE capability information. In some aspects, the indication may be provided using dynamic signaling, semi-static signaling, radio resource control (RRC) signaling, and/or the like.

In some aspects, the UE 120 may determine and/or transmit indications of multiple sets of BWP combinations. For example, the UE 120 may determine respective sets of BWP combinations for any one or more of uplink-only communications, downlink-only communications, or both uplink and downlink communications. The UE 120 may transmit indications corresponding to each set of BWP combinations. Thus, the UE 120 may signal BWP combinations for different communication directions. As another example, the UE 120 may determine multiple sets of BWP combinations for different conditions at the UE 120, and may transmit indications of the multiple sets of BWP combinations. For example, the UE 120 may determine a baseline set of BWP combinations, and a set of BWP combinations for when the UE 120 is associated with a high data rate condition. In this case, the BS 110 may determine which set of BWP combinations is to be used based at least in part on a condition associated with the UE 120. As just one example, the BS 110 may determine whether a high data rate set of BWP combinations is to be used based at least in part on data usage of the UE 120, a buffer status report of the UE 120, and/or the like. A high data rate set of BWP combinations may be associated with a higher cumulative data rate and/or throughput than another set of BWP combinations, such as a baseline set of BWP combinations.

As shown by reference number 320, the BS 110 may determine a BWP configuration for the UE 120 based at least in part on the indication. For example, in some aspects, the BS 110 may select a BWP combination from the set of BWP combinations. In some aspects, the BS 110 may select a BWP combination based at least in part on the set of BWP combinations. For example, the UE 120 may not be guaranteed to receive a BWP combination of the set of BWP combinations. In this case, the BS 110 may prioritize BWP combinations identified by the indication, and may assign a different BWP combination when the BWP combinations identified by the indication cannot be used for the UE 120.

As shown by reference number 325, the BS 110 may configure the UE 120 with the BWP configuration for inter-band CA. For example, the BS 110 may configure the UE 120 to use the BWPs of the selected BWP configuration as active BWPs. In some aspects, the BS 110 may activate the BWPs of the selected BWP configuration (e.g., using downlink control information such as a bandwidth part indicator, using a control channel, using radio resource control (RRC) information, using a media access control (MAC) control element (CE), and/or the like).

As shown by reference number 330, the UE 120 may detect a change in a condition at the UE 120. For example, the UE 120 may determine that a threshold associated with a condition is satisfied. As a first example, the UE 120 may determine that a thermal threshold is satisfied (e.g., which may indicate that the UE 120 should request narrower BWPs and/or lower-frequency BWPs to reduce temperature of the UE 120). As a second example, the UE 120 may determine that a power or battery threshold is satisfied (e.g., which may indicate that the UE 120 should request narrower BWPs and/or lower-frequency BWPs to reduce power usage of the UE 120). As a third example, the UE 120 may determine that a maximum permissible exposure (MPE) threshold is satisfied (e.g., which may indicate that the UE 120 should request wider BWPs so that the UE can reduce the transmit power while still achieving a given rate requirement and thus reduce exposure caused by the UE 120). As a fourth example, the UE 120 may determine that an antenna module is blocked or that the UE 120 has rotated (e.g., which may mean that a different BWP combination, supported by a different antenna module, should be requested). As a fifth example, the UE 120 may determine that a high-data-rate condition is satisfied (e.g., which may mean that a BWP combination with higher-bandwidth BWPs should be used).

As shown by reference number 335, the UE 120 may transmit an updated indication of an updated set of BWP combinations for inter-band CA in FR2. Examples of updated indications are provided in FIG. 4. As shown by reference number 340, the updated indication includes a bitmap, though the indication may take any form that conveys the set of BWP combinations. In some aspects, the UE 120 may transmit the updated indication using dynamic signaling, semi-static signaling, RRC signaling, and/or the like. For example, the UE 120 may transmit the updated indication without detaching and reattaching, without disconnecting and reconnecting, and/or the like. This may conserve network resources and improve UE user experience relative to a system in which the UE 120 must disconnect or detach and reconnect or reattach to reconfigure active carriers or BWPs. Thus, the set of BWP combinations may be time-variant, condition-variant, and/or the like, within an attachment or connection of the UE 120.

As shown by reference number 345, the BS 110 may determine an updated BWP configuration based at least in part on the indication. For example, the BS 110 may select an updated BWP configuration from the updated set of BWP combinations (e.g., using one or more of the operations described above with regard to selecting the BWP configuration from the set of BWP combinations). As shown by reference number 350, the BS 110 may configure the UE 120 to use the updated BWP configuration (e.g., using one or more of the operations described above with regard to the BWP configuration).

In some aspects, the BWPs configured for the UE 120 need not be provided by the same BS 110. For example, a first BWP may be provided by a first BS 110 and a second BWP may be provided by a second BS 110.

As indicated above, FIG. 3 is provided as an example. Other examples may differ from what is described with respect to FIG. 3.

Figure 4:
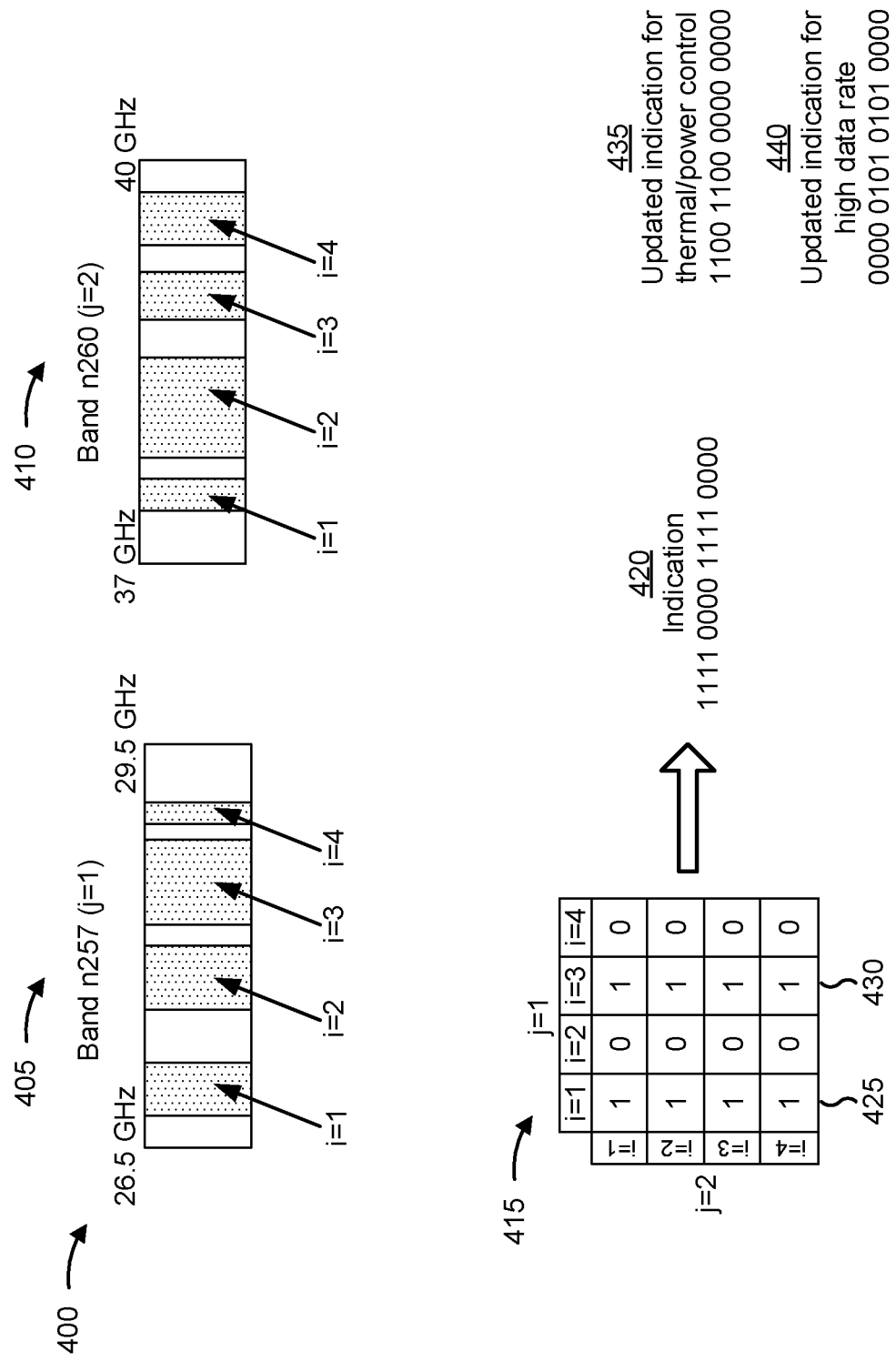
FIG. 4 is a diagram illustrating an example of a signaling structure for inter-band CA, in accordance with various aspects of the present disclosure.

FIG. 4 is a diagram illustrating an example 400 of a signaling structure for inter-band CA, in accordance with various aspects of the present disclosure. In the notation of example 400, i denotes a bandwidth part index, and j denotes a band. Therefore, $BWP_{i,j}$ refers to the ith BWP on the jth band. The set of BWP combinations in example 400 uses band n257 (shown by reference number 405 and assigned j=1) and band n260 (shown by reference number 410 and assigned j=2). Each band includes four configured BWPs, of which one BWP in each band may be activated for the UE 120.

Reference number 415 shows an example set of BWP combinations. Each column corresponds to a respective BWP in band n257 and each row corresponds to a respective BWP in band n260. A bit value of 1 in a table cell corresponding to $BWP_{i,1}$ and $BWP_{i,2}$ may indicate that these two BWPs are requested or supported by the UE 120 as active BWPs, and a bit value of 0 may indicate that the two BWPs are not requested or supported.

The indication corresponding to the set of BWP combinations is shown by reference number 420. Each group of bit values in the indication corresponds to a column of the table shown by reference number 415. For example, the first and third groups (1111 and 1111) correspond to the columns shown by reference numbers 425 and 430. Of course, other structures and arrangements of the bitmap may be used, and the techniques and apparatuses described herein are not limited to this particular structure. Additionally, or alternatively, the indication may take another form, such as a particular cyclic prefix value, a scrambling code, a particular resource used to transmit the indication, and/or the like.

Examples of updated indications are shown by reference numbers 435 and 440. As shown by reference number 435, an updated indication for thermal control or power control may omit some high-frequency BWPs, such as $BWP_{3,1}$ and $BWP_{4,1}$, thereby achieving improved temperature and power control in comparison to the set of BWP combinations shown by reference number 415. As shown by reference number 440, an updated indication for a high data rate may use wide-band BWPs such as $BWP_{3,1}$ and $BWP_{2,2}$, thereby achieving an increased data rate in comparison to the set of BWP combinations shown by reference number 415.

To generalize the structure of the bitmap, consider a case with inter-band CA using K bands, with N supported carrier bandwidths (e.g., BWPs) over each band. In this case, the bitmap may include $N^K$ (e.g., N to the power of K) bit values corresponding to combinations of BWPs.

As indicated above, FIG. 4 is provided as an example. Other examples may differ from what is described with respect to FIG. 4.

Figure 5:
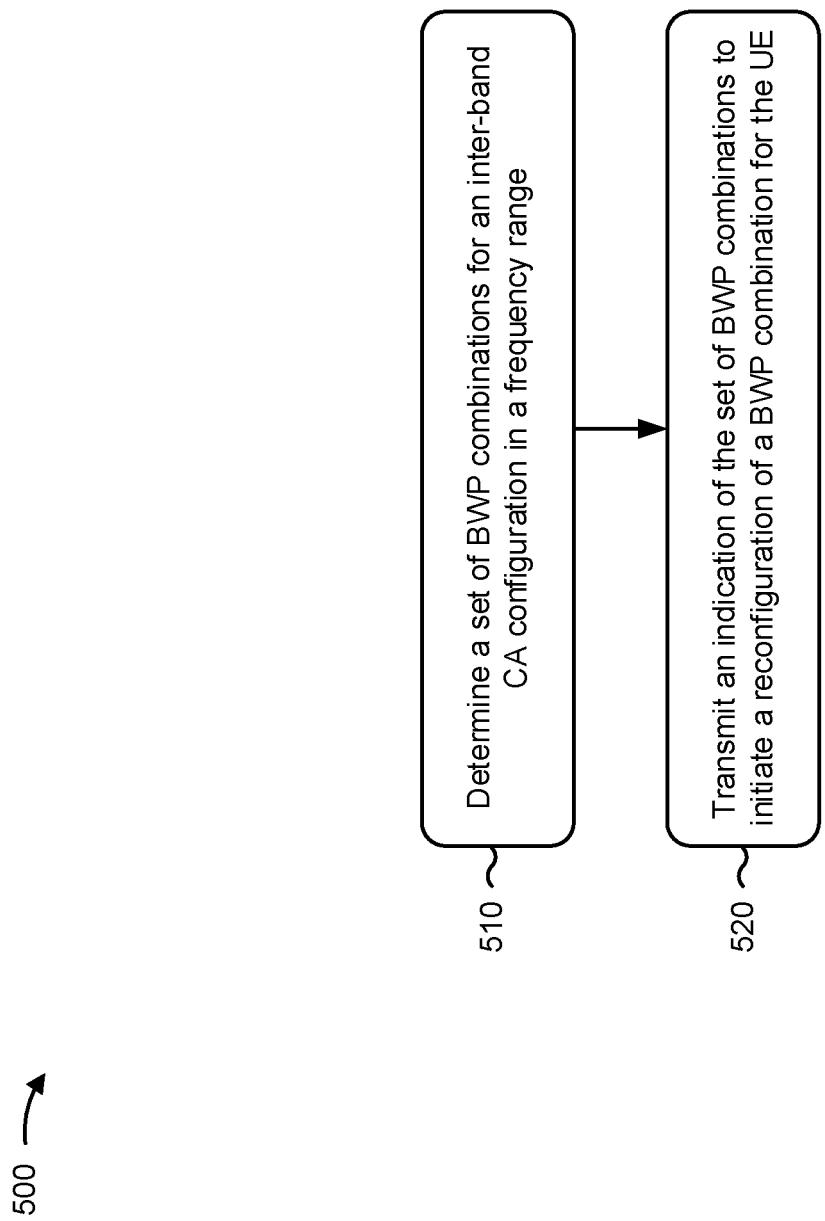
FIG. 5 is a diagram illustrating an example process performed, for example, by a user equipment, in accordance with various aspects of the present disclosure.

FIG. 5 is a diagram illustrating an example process 500 performed, for example, by a user equipment, in accordance with various aspects of the present disclosure. Example process 500 is an example where a UE (e.g., UE 120 and/or the like) performs operations associated with signaling for inter-band carrier aggregation.

As shown in FIG. 5, in some aspects, process 500 may include determining a set of BWP combinations for an inter-band CA configuration in a frequency range above 24 GHz (block 510). For example, the UE (e.g., using controller/processor 280 and/or the like) may determine a set of BWP combinations for an inter-band CA configuration in a frequency range above 24 GHz, as described above, for example, in connection with FIGS. 3 and/or 4.

As further shown in FIG. 5, in some aspects, process 500 may include transmitting an indication of the set of BWP combinations to initiate a reconfiguration of a BWP combination for the UE (block 520). For example, the UE (e.g., using controller/processor 280, transmit processor 264, TX MIMO processor 266, MOD 254, antenna 252, and/or the like) may transmit an indication of the set of BWP combinations to initiate a reconfiguration of a BWP combination for the UE, as described above, for example, in connection with FIGS. 3 and/or 4.

Process 500 may include additional aspects, such as any single aspect or any combination of aspects described below and/or in connection with one or more other processes described elsewhere herein.

In a first aspect, the UE may detect a change in a condition at the UE, and transmit an updated indication of an updated set of BWP combinations based at least in part on detecting the change at the UE.

In a second aspect, alone or in combination with the first aspect, the indication and the updated indication comprise dynamic or semi-static indications.

In a third aspect, alone or in combination with one or more of the first and second aspects, determining the set of BWP combinations is based at least in part on at least one of a power consumption condition of the UE, a maximum permissible exposure condition of the UE, a thermal condition of the UE, a dynamic choice of antenna numbers from a set of antenna modules supported by the UE, a preferred sub-array type supported by the UE, or a use case at the UE.

In a fourth aspect, alone or in combination with one or more of the first through third aspects, the indication is transmitted via radio resource control (RRC) signaling.

In a fifth aspect, alone or in combination with one or more of the first through fourth aspects, determining the set of BWP combinations is based at least in part on whether the BWP combination for the UE is to be used for a downlink-only transmission, an uplink-only transmission, or both downlink and uplink transmissions.

In a sixth aspect, alone or in combination with one or more of the first through fifth aspects, the BWP combination for the UE comprises BWPs on bands provided by one base station across different bands or bands provided by two or more base stations.

In a seventh aspect, alone or in combination with one or more of the first through sixth aspects, the frequency range is associated with a millimeter wave communication technology.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
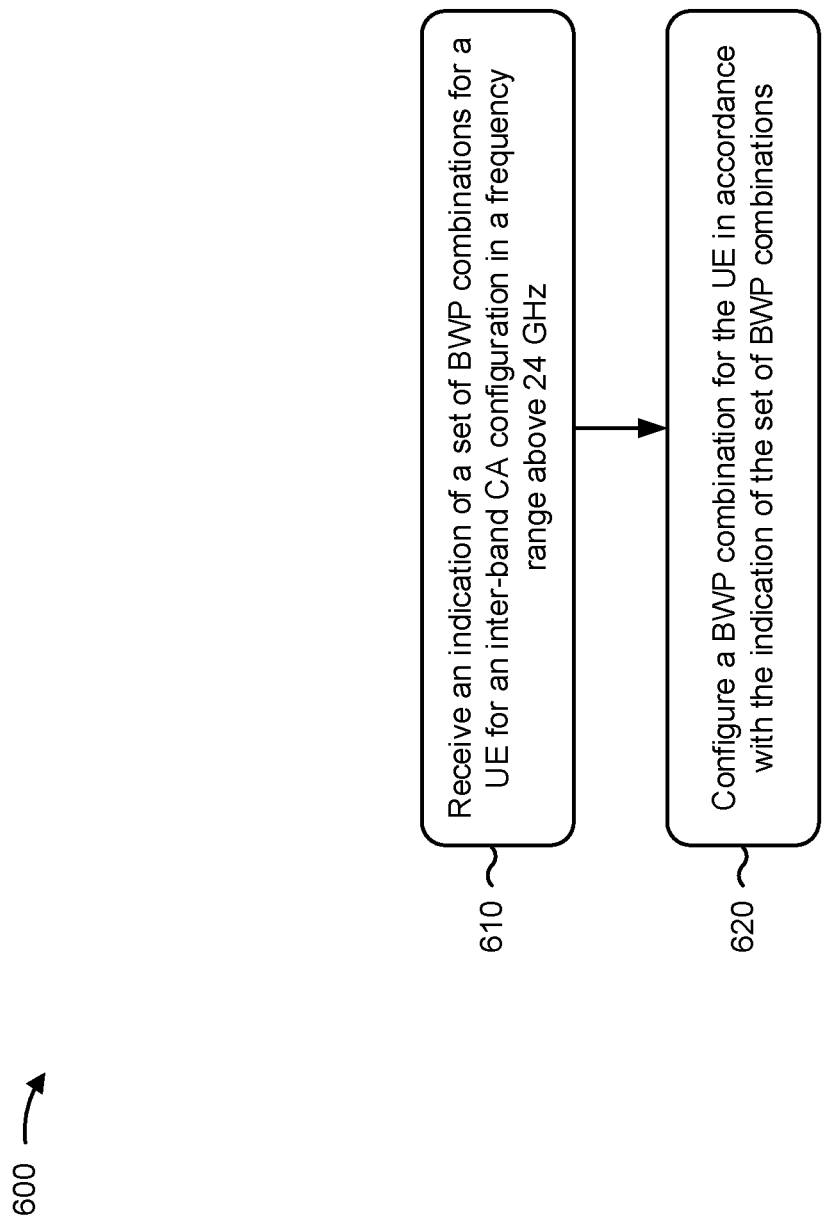
FIG. 6 is a diagram illustrating an example process performed, for example, by a base station, in accordance with various aspects of the present disclosure.

FIG. 6 is a diagram illustrating an example process 600 performed, for example, by a base station, in accordance with various aspects of the present disclosure. Example process 600 is an example where a base station (e.g., BS 110 and/or the like) performs operations associated with signaling for inter-band carrier aggregation.

As shown in FIG. 6, in some aspects, process 600 may include receiving an indication of a set of BWP combinations for a UE for an inter-band CA configuration in a frequency range above 24 GHz (block 610). For example, the base station (e.g., using antenna 234, DEMOD 232, MIMO detector 236, receive processor 238, controller/processor 240, and/or the like) may receive an indication of a set of BWP combinations for a UE for an inter-band CA configuration in a frequency range above 24 GHz, as described above, for example, in connection with FIGS. 3 and/or 4.

As further shown in FIG. 6, in some aspects, process 600 may include configuring a BWP combination for the UE in accordance with the indication of the set of BWP combinations (block 620). For example, the base station (e.g., using controller/processor 240, transmit processor 220, TX MIMO processor 230, MOD 232, antenna 234, and/or the like) may configure a BWP combination for the UE in accordance with the indication of the set of BWP combinations, as described above, for example, in connection with FIGS. 3 and/or 4.

Process 600 may include additional aspects, such as any single aspect or any combination of aspects described below and/or in connection with one or more other processes described elsewhere herein.

In a first aspect, the base station may receive an updated indication of an updated set of BWP combinations based at least in part on a change in a condition at the UE.

In a second aspect, alone or in combination with the first aspect, the indication and the updated indication comprise dynamic or semi-static indications.

In a third aspect, alone or in combination with one or more of the first and second aspects, the indication is received via RRC signaling.

In a fourth aspect, alone or in combination with one or more of the first through third aspects, the set of BWP combinations is based at least in part on whether the BWP combination for the UE is to be used for a downlink-only transmission, an uplink-only transmission, or both uplink and downlink transmissions.

In a fifth aspect, alone or in combination with one or more of the first through fourth aspects, the BWP combination for the UE comprises BWPs on bands provided by one base station across different bands or bands provided by two or more base stations including the base station.

In a sixth aspect, alone or in combination with one or more of the first through fifth aspects, the frequency range is associated with a millimeter wave communication technology.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    transmitting, by the UE, an indication of a set of bandwidth part (BWP) combinations for an inter-band carrier aggregation (CA) configuration in a frequency range above 24 GHz to enable selection of BWPs for the inter-band CA configuration for the UE, the indication indicating, for each BWP combination of the set of BWP combinations, whether BWPs in the BWP combination are requested or supported by the UE; and
    receiving, by the UE, the inter-band CA configuration, the inter-band CA configuration comprising BWPs selected based on the transmitted indication of the set of BWP combinations.

2. The method of claim 1, further comprising:
    detecting a change in a condition at the UE; and
    transmitting an updated indication of an updated set of BWP combinations based at least in part on detecting the change at the UE.

3. The method of claim 2, wherein the indication and the updated indication comprise dynamic or semi-static indications.

4. The method of claim 1, wherein the transmitted indication of the set of BWP combinations is determined based at least in part on at least one of:
    a power consumption condition of the UE,
    a maximum permissible exposure condition of the UE,
    a thermal condition of the UE,
    a dynamic choice of antenna numbers from a set of antenna modules supported by the UE,
    a preferred subarray type supported by the UE, or
    a use case at the UE.

5. The method of claim 1, wherein the indication is transmitted via radio resource control (RRC) signaling.

6. The method of claim 1, wherein the transmitted indication indicating the set of BWP combinations is determined based at least in part on whether the BWP combination is to be used for a downlink-only transmission, an uplink-only transmission, or both downlink and uplink transmissions.

7. The method of claim 1, wherein the selected BWPs in the inter-band CA configuration comprise BWPs on bands provided by one base station across different bands or bands provided by two or more base stations.

8. The method of claim 1, wherein the frequency range is associated with a millimeter wave communication technology.

9. A method of wireless communication performed by a base station, comprising:
    receiving, by the base station, an indication of a set of bandwidth part (BWP) combinations for a user equipment (UE) for an inter-band carrier aggregation (CA) configuration in a frequency range above 24 GHz, the indication indicating, for each BWP combination of the set of BWP combinations, whether BWPs in the BWP combination are requested or supported by the UE; and
    configuring the inter-band CA configuration, the inter-band CA configuration comprising BWPs selected based on the received indication.

10. The method of claim 9, further comprising:
    receiving an updated indication of an updated set of BWP combinations based at least in part on a change in a condition at the UE.

11. The method of claim 10, wherein the indication and the updated indication comprise dynamic or semi-static indications.

12. The method of claim 9, wherein the indication is received via radio resource control (RRC) signaling.

13. The method of claim 9, wherein the received indication indicating the set of BWP combinations is determined based at least in part on whether the BWP combination is to be used for a downlink-only transmission, an uplink-only transmission, or both uplink and downlink transmissions.

14. The method of claim 9, wherein the selected BWPs in the inter-band CA configuration comprise BWPs on bands provided by one base station across different bands or bands provided by two or more base stations including the base station.

15. The method of claim 9, wherein the frequency range is associated with a millimeter wave communication technology.

16. A user equipment (UE) for wireless communication, comprising:
    a memory; and
    one or more processors operatively coupled to the memory, the memory and the one or more processors configured to:
        transmit an indication of a set of bandwidth part (BWP) combinations for an inter-band carrier aggregation (CA) configuration in a frequency range above 24 GHz to enable selection of BWPs for the inter-band CA configuration for the UE, the indication indicating, for each BWP combination of the set of BWP combinations, whether BWPs in the BWP combination are requested or supported by the UE; and
        receive the inter-band CA configuration, the inter-band CA configuration comprising BWPs selected based on the transmitted indication of the set of BWP combinations.

17. The UE of claim 16, wherein the one or more processors are further configured to:
   detect a change in a condition at the UE; and
   transmit an updated indication of an updated set of BWP combinations based at least in part on detecting the change at the UE.

18. The UE of claim 17, wherein the indication and the updated indication comprise dynamic or semi-static indications.

19. The UE of claim 16, wherein the memory and the one or more processors are further configured to determine the transmitted indication of the set of BWP combinations based at least in part on at least one of:
   a power consumption condition of the UE,
   a maximum permissible exposure condition of the UE,
   a thermal condition of the UE,
   a dynamic choice of antenna numbers from a set of antenna modules supported by the UE,
   a preferred subarray type supported by the UE, or
   a use case at the UE.

20. The UE of claim 16, the memory and the one or more processors configured to transmit the indication via radio resource control (RRC) signaling.

21. The UE of claim 16, wherein the memory and the one or more processors are further configured to determine the set of BWP combinations based at least in part on whether the BWP combination is to be used for a downlink-only transmission, an uplink-only transmission, or both downlink and uplink transmissions.

22. The UE of claim 16, wherein the selected BWPs in the inter-band CA configuration comprise BWPs on bands provided by one base station across different bands or bands provided by two or more base stations.

23. The UE of claim 16, wherein the frequency range is associated with a millimeter wave communication technology.

24. A base station for wireless communication, comprising:
   a memory; and
   one or more processors operatively coupled to the memory, the memory and the one or more processors configured to:
      receive an indication of a set of bandwidth part (BWP) combinations for a user equipment (UE) for an inter-band carrier aggregation (CA) configuration in a frequency range above 24 GHz, the indication indicating, for each BWP combination of the set of BWP combinations, whether BWPs in the BWP combination are requested or supported by the UE; and
      configure the inter-band CA configuration, the inter-band CA configuration comprising BWPs selected based on the received indication.

25. The base station of claim 24, wherein the one or more processors are further configured to:
   receive an updated indication of an updated set of BWP combinations based at least in part on a change in a condition at the UE.

26. The base station of claim 25, wherein the indication and the updated indication comprise dynamic or semi-static indications.

27. The base station of claim 24, the memory and the one or more processors configured to receive the indication via radio resource control (RRC) signaling.

28. The base station of claim 24, wherein the received indication indicating the set of BWP combinations is determined based at least in part on whether the BWP combination is to be used for a downlink-only transmission, an uplink-only transmission, or both uplink and downlink transmissions.

29. The base station of claim 24, the selected BWPs in the inter-band CA configuration comprise BWPs on bands provided by one base station across different bands or bands provided by two or more base stations including the base station.

30. The base station of claim 24, wherein the frequency range is associated with a millimeter wave communication technology.

* * * * *